United States Patent
Handing et al.

(10) Patent No.: US 8,622,446 B2
(45) Date of Patent: Jan. 7, 2014

(54) BUMPER FOR A MOTOR VEHICLE

(75) Inventors: Christian Handing, Langenberg (DE); Michael Roll, Herford (DE); Ulrich Lüdtke-Bexten, Paderborn (DE); Elmar Mollemeier, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 24 days.

(21) Appl. No.: 13/285,544

(22) Filed: Oct. 31, 2011

(65) Prior Publication Data

US 2012/0104779 A1 May 3, 2012

(30) Foreign Application Priority Data

Nov. 2, 2010 (DE) .......................... 10 2010 050 013

(51) Int. Cl.
*B60R 19/04* (2006.01)

(52) U.S. Cl.
USPC .......................................................... 293/155

(58) Field of Classification Search
USPC ................. 293/155, 102, 117, 120, 132, 133; 296/187.09
See application file for complete search history.

(56) References Cited

U.S. PATENT DOCUMENTS

| | | | | |
|---|---|---|---|---|
| 5,154,462 A | * | 10/1992 | Carpenter | 293/120 |
| 5,997,058 A | * | 12/1999 | Pedersen | 293/102 |
| 6,349,521 B1 | | 2/2002 | McKeon et al. | |
| 6,554,345 B2 | * | 4/2003 | Jonsson | 296/146.6 |
| 6,929,297 B2 | * | 8/2005 | Muller et al. | 293/133 |
| 6,971,691 B1 | * | 12/2005 | Heatherington et al. | 293/102 |
| 7,163,241 B2 | * | 1/2007 | Liu et al. | 293/102 |
| 7,316,432 B2 | * | 1/2008 | Muskos | 293/102 |
| 7,399,013 B2 | * | 7/2008 | Lutke-Bexten et al. | 293/102 |
| RE40,736 E | * | 6/2009 | Heatherington et al. | 293/102 |
| 7,611,175 B2 | * | 11/2009 | Tornberg | 293/102 |
| 7,794,006 B2 | * | 9/2010 | Karlander | 296/102 |
| 7,874,600 B2 | * | 1/2011 | Hashimura | 293/102 |
| 7,874,601 B2 | * | 1/2011 | Tanskanen | 293/133 |
| 7,905,526 B2 | * | 3/2011 | Asplund | 293/102 |
| 8,020,907 B2 | * | 9/2011 | Wibbeke et al. | 293/133 |
| 8,087,706 B2 | * | 1/2012 | Karlander et al. | 293/102 |
| 8,152,210 B2 | * | 4/2012 | Lutke-Bexten et al. | 293/102 |
| 8,276,954 B2 | * | 10/2012 | Handing et al. | 293/133 |

(Continued)

FOREIGN PATENT DOCUMENTS

| | | |
|---|---|---|
| DE | 102008059750 | 6/2010 |
| EP | 0 937 611 A1 | 8/1999 |
| EP | 1 730 002 B1 | 9/2007 |
| EP | 1 732 801 B1 | 6/2008 |

*Primary Examiner* — Kiran B Patel
(74) *Attorney, Agent, or Firm* — Henry M. Feiereisen LLC

(57) ABSTRACT

A bumper for a motor vehicle includes a crossbeam having a hat profile defined by a bottom wall, legs respectively adjoining the bottom wall, and flanges respectively extending from the legs. The hat profile has sections of varying cross sectional configuration in a longitudinal direction. A face plate closes the hat profile to define a hollow space, with the crossbeam being mountable with the face plate such as to point outwards. An upper one of the legs has a width which is greater than a width of a lower one of the legs in a center section of the crossbeam. The crossbeam has curved ends oriented in a direction of the motor vehicle, and the face plate includes in the center section a stiffening embossment which is oriented into the hollow space defined by the hat profile and the face plate.

15 Claims, 2 Drawing Sheets

(56) References Cited

U.S. PATENT DOCUMENTS

| | | |
|---|---|---|
| 2004/0217607 A1* | 11/2004 | Bladow et al. ............... 293/155 |
| 2004/0262931 A1* | 12/2004 | Roussel et al. ............... 293/120 |
| 2005/0104392 A1* | 5/2005 | Liebhard et al. ............. 293/132 |
| 2006/0033363 A1 | 2/2006 | Hillekes et al. |
| 2006/0290149 A1 | 12/2006 | Roll et al. |
| 2006/0290150 A1* | 12/2006 | Roll et al. .................... 293/133 |
| 2007/0040398 A1 | 2/2007 | Luetke-Bexten et al. |
| 2007/0182176 A1* | 8/2007 | Muskos ........................ 293/133 |
| 2007/0210590 A1 | 9/2007 | Gouillart et al. |
| 2008/0083498 A1 | 4/2008 | Handing |
| 2008/0224487 A1 | 9/2008 | Wang et al. |
| 2008/0252087 A1 | 10/2008 | Roll et al. |
| 2009/0026777 A1* | 1/2009 | Schmid et al. ............... 293/133 |
| 2009/0045638 A1 | 2/2009 | Handing et al. |
| 2009/0162688 A1 | 6/2009 | Handing et al. |
| 2009/0236163 A1 | 9/2009 | Wibbeke et al. |
| 2009/0243312 A1 | 10/2009 | Handing et al. |
| 2009/0243313 A1 | 10/2009 | Handing et al. |
| 2010/0133859 A1* | 6/2010 | Lutke-Bexten et al. ...... 293/102 |
| 2010/0133861 A1 | 6/2010 | Luetke-Bexten et al. |
| 2010/0176610 A1* | 7/2010 | Roll et al. .................... 293/120 |
| 2010/0194125 A1 | 8/2010 | Wibbeke et al. |
| 2011/0121587 A1* | 5/2011 | Handing et al. .............. 293/133 |
| 2011/0233946 A1* | 9/2011 | Pellmann et al. ............. 293/132 |
| 2011/0254294 A1* | 10/2011 | Handing et al. .............. 293/102 |
| 2012/0032459 A1* | 2/2012 | Fang et al. .................... 293/132 |
| 2012/0119526 A1* | 5/2012 | Clausen et al. ............... 293/133 |
| 2012/0153645 A1* | 6/2012 | Roll et al. .................... 293/120 |

* cited by examiner

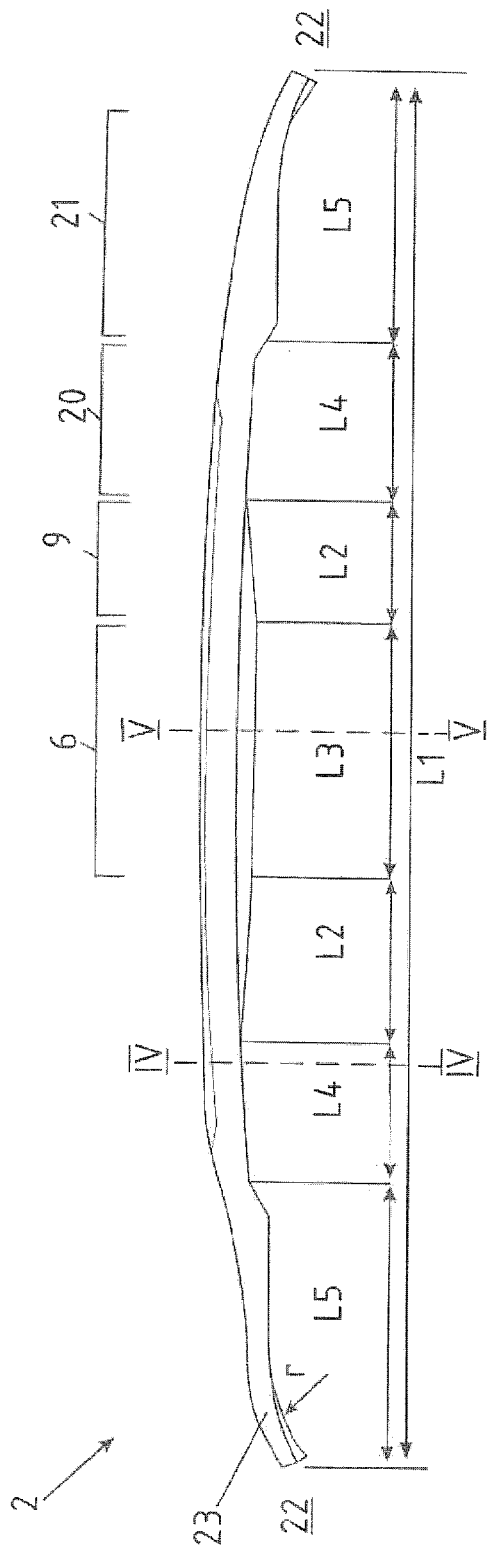
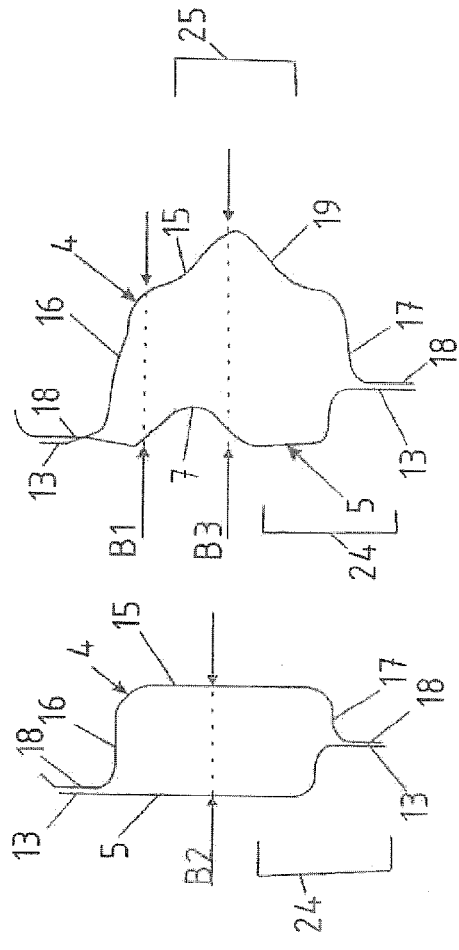
Fig. 3
Fig. 4
Fig. 5

BUMPER FOR A MOTOR VEHICLE

CROSS-REFERENCES TO RELATED APPLICATIONS

This application claims the priority of German Patent Application, Serial No. 10 2010 050 013.5, filed Nov. 2, 2010, pursuant to 35 U.S.C. 119(a)-(d), the content of which is incorporated herein by reference in its entirety as if fully set forth herein.

BACKGROUND OF THE INVENTION

The present invention relates to a bumper for a motor vehicle.

The following discussion of related art is provided to assist the reader in understanding the advantages of the invention, and is not to be construed as an admission that this related art is prior art to this invention.

Conventional bumpers are commonly installed across the front and rear of motor vehicles to absorb impact energy caused by small collisions, thereby minimizing damage to the actual support structure of the motor vehicle. Bumpers also enhance crash safety in the event of a frontal crash or rear-end crash because of their interaction with a crash box to absorb kinetic energy and their contribution to crash stiffness of the overall motor vehicle body.

A bumper is typically constructed of a crossbeam which can be attached transversely to the longitudinal rails of the motor vehicle frame by incorporating crash boxes. The crossbeam deflects energy resulting from an impact into the crash boxes, where the impact energy is converted into deformation energy.

Bumpers must comply with regulations and meet the demands by consumer protection organizations with respect to protection of pedestrians. Moreover, bumpers have to meet classification tests of insurance companies (RCAR, GDV). Also automakers demand bumper configurations that allow optimum space utilization, easy installation, maximum energy absorption, and are lightweight as well as economically viable. In particular the desired reduction in $CO_2$ emission requires lightweight construction when designing vehicles.

It would therefore be desirable and advantageous to provide an improved bumper for motor vehicles, which obviates prior art shortcomings and is reliable in operation while yet being lightweight and simple in structure with optimal energy absorption.

SUMMARY OF THE INVENTION

According to one aspect of the present invention, a bumper for a motor vehicle includes a crossbeam having a hat profile defined by a bottom wall, legs respectively adjoining the bottom wall, and flanges respectively extending from the legs, with the hat profile having sections of varying cross sectional configuration in a longitudinal direction, and a face plate closing the hat profile of the crossbeam to define a hollow space, with the crossbeam being mountable with the face plate such as to point outwards, wherein an upper one of the legs has a width which is greater than a width of a lower one of the legs in a center section of the crossbeam, wherein the crossbeam has curved ends oriented in a direction of the motor vehicle, wherein the face plate includes a stiffening embossment in the center section, with the stiffening embossment being oriented into the hollow space defined by the hat profile and the face plate.

When the crossbeam is installed, the stiffening embossment of the face plate points to the motor vehicle. The stiffening embossment enhances stiffness of the center section of the crossbeam. This affords the possibility in particular to realize various crash specification profiles for overlapping vehicle classes by additional arrangement and dimensioning of the stiffening embossment. Through positioning and depth of the stiffening embossment, the crash energy absorbing capability of the crossbeam can be adaptively suited beforehand individually from utility vehicle to sports car.

The two legs of the hat profile define an upper leg and a lower leg so that in relation to a vehicle coordinate system an upper leg is arranged above a lower leg in Z-direction. The upper leg can have a width which is greater than a width of the lower leg. In other words, the geometric dimensions of the upper leg are sized in relation to the vehicle coordinate system longer in X-direction than the width of the lower leg pointing in X-direction.

Overall, this arrangement positively affects frontal crash behavior. The greater width of the upper leg increases stiffness of the crossbeam according to the invention. The smaller width of the lower leg deflects obstacles to an area below the motor vehicle in the event of a frontal crash, without adversely affecting the overall stiffness of the crossbeam in combination with the upper leg.

According to another advantageous feature of the present invention, the face plate can have a joining flange and is thereby so configured as to provide at least one area with an S-shaped cross section in the longitudinal direction. This involves in particular the lower region of the face plate, with the lower region of the face plate relating within the scope of the invention to the vehicle coordinate system in Z-direction. The substantial S-shaped configuration may also involve an overlap of an S-shaped configuration and/or Z-shaped configuration. The substantial S-shaped configuration optimizes a joining capability between the face plate and the lower flange of the crossbeam, provides stiffness in X-direction due to the lower leg, and assists in the attachment to a motor vehicle body due to the bottom wall. Advantageously, the S-shaped configuration extends along the entire length direction of the crossbeam. Optionally, the S-shaped configuration may also be provided only in some areas of the crossbeam.

According to another advantageous feature of the present invention, the bottom wall can be formed in the center section with an embossment which is oriented towards the motor vehicle. The embossment can be configured as a longitudinal embossment in Y-direction of the motor vehicle. The valley of the embossment or orientation of the embossment is configured to point towards the motor vehicle, when the crossbeam is installed. The hollow space defined by the hat profile and the face plate can thus be expanded. The presence of the embossment in the center section enhances stiffness in vehicle X-direction. In particular in concert with the legs, the embossment can be considered as an extension of the width of the legs in X-direction, when viewed in a plan view from Z-direction. The entire width of the crossbeam according to the invention is therefore increased by the embossment in the center section.

According to another advantageous feature of the present invention, the crossbeam may have transitions extending from opposite sides of the center section in a direction of the ends. The presence of the transitions renders manufacture of a crossbeam according to the invention cost-efficient option. The embossment formed in the center section may taper off in the transition so as to eliminate the need for a forming tool to carry out complex forming steps during sheet metal forming of a crossbeam according to the invention. Furthermore, the transitions provide additional reinforcement and stiffening of the crossbeam according to the invention. Thus, there is no weak point even though the embossment tapers off so that the crossbeam does not buckle in the event of a crash.

According to another advantageous feature of the present invention, the embossment in the center section can extend into the transitions and is tapered in the transitions. This also renders the manufacture of a bumper according to the invention cost-efficient. The tapered configuration of the embossment still provides an acceptable stiffness behavior in the transition while allowing easy formability of the hat profile in these sections.

According to another advantageous feature of the present invention, the face plate may have joining flanges provided for connection of the face plate with the hat profile. Advantageously, the face plate is connected via the joining flanges with the hat profile by a material joint. Material joint may involve hereby thermal joining which represents a cost-efficient production process and includes for example spot welding or resistance welding. It is, of course, also conceivable to provide a formfit as connection between the face plate and the hat profile. An example of a formfit includes a tongue and groove joint on at least one flange side, with the other flange side, after being inserted, being connected through a material joint in such a way that the tongue and groove joint is non-detachably connected, e.g. by bonding. Another example of a formfit may include a comb-like engagement between face plate and hat profile in the area of a joining flange.

According to another advantageous feature of the present invention, the face plate and the hat profile may also be coupled by forced engagement. Examples of a forced engagement may include riveting or bolting. Also possible is a combination of material joint, forced engagement and/or formfit. An example of such a combination may include bonding and riveting. Also bolting may be employed for a connection.

The hat profile and the face plate may be made of different materials. For example, one of the structural parts may be made of light metal whereas the other structural part may be made of a metal alloy. It is also possible within the scope of the invention to use different material combinations. It is for example conceivable to manufacture a face plate of plastic or fiber composite and to combine it with a crossbeam of a metallic material. Metallic materials may hereby be hardened or quenched and tempered, in particular hot-formed and press-hardened. Various sections may undergo a local heat treatment to tailor the strength values of different section of the crossbeam according to the invention.

According to another advantageous feature of the present invention, the transitions can be continued by intermediate sections in the direction of the ends. The intermediate sections may have a substantially rectangular configuration or also round configuration. The presence of intermediate sections enables the realization of different widths of the crossbeam according to the invention in Y-direction, without requiring the use of pressing tools for the stiffness-relevant transition and center sections. Furthermore, the presence of intermediate sections enables the provision of targeted crash properties. For example, it is conceivable to provide the intermediate sections of the crossbeam according to the invention for energy absorption.

According to another advantageous feature of the present invention, the intermediate sections can be continued by end sections. The end sections may advantageously be curved towards the motor vehicle. The whole crossbeam is only slightly curved along its longitudinal direction to best suit the geometric and design dimensions of the motor vehicle and to utilize the available installation space. By the added curvature of the ends, obstacles can be deflected in a targeted manner in the event of a frontal crash or rear-end crash. Furthermore, the curved ends cause also a deflection to the outer side of the motor vehicle, which is important for protection of pedestrians. The end sections also can be used to receive the crash boxes. Of course, the crash boxes may also be arranged in a region between the end sections and the intermediate sections. The positioning of the crash boxes is however ultimately dependent on the demands at hand for a motor vehicle to which a bumper according to the invention is intended to be attached.

According to another advantageous feature of the present invention, the center section of the crossbeam may have in X-direction of the motor vehicle a substantially constant width between the face plate and the bottom wall. The face plate and the bottom wall assume a substantially vertical orientation when installed so that the respective base and/or center areas are spaced by these two geometric bodies at a distance which corresponds to the width between the face plate and the bottom wall. The distance extends substantially constant over the entire center section, i.e. the distance remains the same.

According to another advantageous feature of the present invention, the center section of the crossbeam may have in X-direction of the motor vehicle a substantially constant width between the face plate and the embossment of the bottom wall. An important aspect for determining this width is the distance of the valley or peak of the embossment to the base plane formed by the face plate. This does not involve the stiffening embossment formed in the face plate itself.

According to another advantageous feature of the present invention, the width between the face plate and the bottom wall can be sized 0.6 to 0.7 times the width between the embossment of the bottom wall and the face plate. Advantageously, the width between the face plate and the bottom wall is two thirds the width between the face plate and the embossment. As a consequence of this ratio, the stiffness is positively affected in the center section while the own weight of the overall crossbeam is slight.

According to another advantageous feature of the present invention, the intermediate sections can each have in X-direction of the motor vehicle a substantially constant width between the face plate and the bottom wall. In this way, production of the crossbeam according to the invention is simplified for the area of the intermediate section while at the same time being able to select different geometric dimensions in longitudinal direction for the intermediate section.

According to another advantageous feature of the present invention, the center section of the crossbeam can have in longitudinal direction of the crossbeam a length which is sized 0.05 to 0.15 times the total length of the crossbeam. Advantageously, the length of the center section of the crossbeam is 0.1 times the total length of the crossbeam. This ensures sufficient crash safety and stiffness of the center section while at the same time simplifying production of the entire crossbeam.

According to another advantageous feature of the present invention, each transition can have in longitudinal direction of the crossbeam a length which is 0.1 to 0.2 times the total length of the crossbeam.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a top view of a crossbeam of the bumper;

FIG. 4 is a cross sectional view of an intermediate section of the crossbeam, taken along the line IV-IV in FIG. 3; and FIG. 5 is a cross sectional view of a center section of the crossbeam, taken along the line V-V in FIG. 3.

DETAILED DESCRIPTION OF PREFERRED EMBODIMENTS

Figure 1:
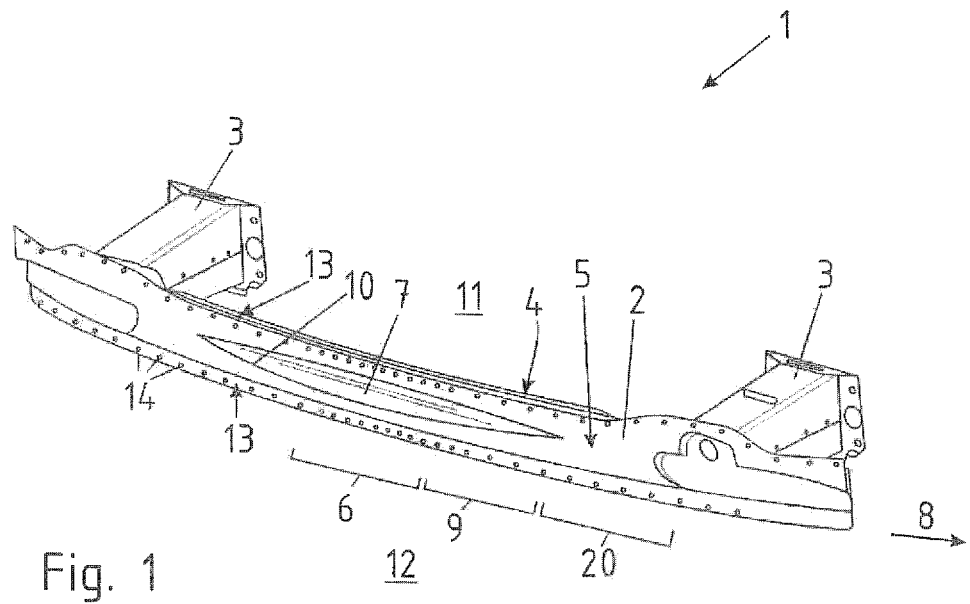
FIG. 1 is a top and front perspective view of a bumper according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top and front perspective view of a bumper according to the present invention, generally designated by reference numeral 1. The bumper 1 includes a crossbeam 2 and crash boxes 3 connected to the crossbeam 2. The crossbeam 2 has a hat profile 4 and a face plate 5 which is coupled to the hat profile 4 to close the hat profile 4 and thereby define a hollow space there between. In the non-limiting embodiment shown in FIG. 1, the face plate 5 has a center section 6 which is formed with a stiffening embossment 7 oriented into the hollow space defined by the hat profile 4 and the face plate 5. The stiffening embossment 7 of the face plate 5 extends in longitudinal direction, as indicated by arrow 8, of the crossbeam 2 to transitions 9 of the crossbeam 2 which level off in tapering end zones 10. The face plate 5 has joining flanges 13 at an upper side 11 and a lower side 12 of the crossbeam 2. The joining flanges 13 are coupled with not shown flanges of the hat profile 4, with the coupling being realized by welding spots 14 through a resistance welding process.

Figure 2:
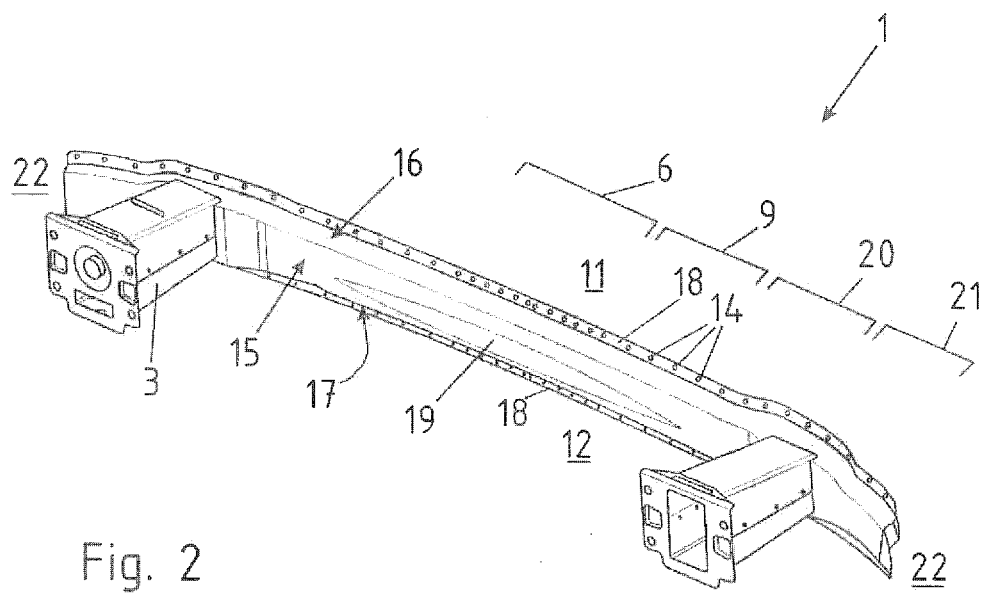
FIG. 2 is a top and rear perspective view of the bumper.

FIG. 2 is a top and rear perspective view of the bumper 1 and shows that the hat profile 4 has a bottom wall 15 with an upper leg 16 and a lower leg 17, both connected to the bottom wall 15. Extending from the legs 16, 17 are flanges 18, respectively. The cross beam 2 is formed in the center section 6 with an embossment 19 which points in the direction of a motor vehicle, not shown here. The embossment 19 also extends into transitions 9 where it tapers off. The transitions 9 are continued by intermediate sections 20 which are again followed by end sections 21. The crash boxes 3 are coupled to the crossbeam 2 and oriented in the region of the end sections 21 towards the intermediate sections 20.

FIG. 3 is a top view of the crossbeam 2 and shows that the crossbeam 2 has ends 22 with a curvature 23 defined by a radius r. The curvature 23 is oriented in the direction of the not shown motor vehicle. The crossbeam 2 has a total length L1 and includes from left to right over the drawing plane an end section 21, an intermediate section 20, a transition 9, a center section 6, a transition 9, an intermediate section 20 and an end section 21. The respective sections have specific lengths, with the end section 21 being defined by length L5, the intermediate section being defined by length L4, the transition 9 being defined by length L2, and the center section 6 being defined by length L3.

For example, the length L3 of the center section 6 of the crossbeam 2 is sized 0.05 to 0.15 times the total length L1 of the crossbeam 2 in the longitudinal direction of the crossbeam 2. Currently preferred is a configuration whereby the length L3 of the center section 6 is 0.1 times the total length L1 of the crossbeam 2. The length L2 of the transition 9 is sized 0.1 to 0.2 times the total length L1 of the crossbeam 2 in the longitudinal direction of the crossbeam 2.

FIG. 4 is a cross sectional view of intermediate section 20 of the crossbeam 2, taken along the line IV-IV in FIG. 3, and shows the configuration of the hat profile 4 with bottom wall 15, upper leg 16 connected to an upper side of the hat profile 4, and lower leg 17 connected to a lower side of the bottom wall 15. Extending from the legs 16, 17 are the flanges 18 which point upwards and downwards, respectively, in relation to the installation direction. The face plate 5 is configured in the shape of an S in a lower region 24. The distance from the face plate 5 to the bottom wall 15 is defined by a width B2.

FIG. 5 is a cross sectional view of the crossbeam 2 in the center section 6, taken along the line V-V in FIG. 3, and shows the configuration of the hat profile 4 with bottom wall 15, upper leg 16 connected to the bottom wall 15, lower leg 17, and flanges 18 extending from the legs 16, 17. The upper leg 16 has a width which is greater than a width of the lower leg 17. The bottom wall 15 includes in the center section an embossment 19. The face plate 5 is also configured in a lower zone 24 with an S-shaped cross section. In addition, the face plate 5 includes stiffening embossment 7.

The distance from the embossment 19 to the face plate 5 is defined by width B3 in midsection 25. The distance from the bottom wall 15 to the face plate 5 is defined by width B1.

For example, the width B1 between the face plate 5 and the bottom wall 15 is sized 0.6 to 0.7 times the width B3 between the embossment 19 of the bottom wall 15 and the face plate 5. Currently preferred is a configuration in which the width B1 is two thirds of the width B3. The width B2 between the face plate 5 and the bottom wall 15 in the intermediate section 20 is sized 0.9 to 1.1 the width B1 between the face plate 5 and the bottom wall 15 in the center section. Currently preferred is B1=B2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A bumper for a motor vehicle, comprising:
   a crossbeam having a hat profile defined by a bottom wall, legs respectively adjoining the bottom wall, and flanges respectively extending from the legs, said hat profile having sections of varying cross sectional configuration in a longitudinal direction; and
   a face plate closing the hat profile of the crossbeam to define a hollow space, with the crossbeam being mountable with the face plate such as to point outwards, wherein an upper one of the legs has a width which is greater than a width of a lower one of the legs in a center section of the crossbeam, wherein the crossbeam has curved ends oriented in a direction of the motor vehicle, and transitions extending from opposite sides of the center section in a direction of the ends wherein the face plate includes in the center section a stiffening embossment, said stiffening embossment being oriented into the hollow space defined by the hat profile and the face plate wherein the bottom wall is formed in the center section with an embossment which is oriented towards the motor vehicle, said embossment extending to the transitions and having a tapered configuration in the transitions, wherein the center section of the crossbeam has in X-direction of the motor vehicle a substantially constant second width between the face plate and the embossment, and wherein the center section of the crossbeam has in X-direction of the motor vehicle a substantially constant first width between the face plate and the bottom wall, said first width being sized 0.6 to 0.7 times the second width.

2. The bumper of claim 1, wherein the face plate has a joining flange and is thereby configured such as to provide at least one area with an S-shaped cross section in the longitudinal direction.

3. The bumper of claim 1, wherein the bottom wall is formed in the center section with an embossment which is oriented towards the motor vehicle.

4. The bumper of claim 1, wherein the face plate has joining flanges provided for connection of the face plate with the hat profile.

5. The bumper of claim 4, wherein the face plate is connected via the joining flanges with the hat profile by a material joint.

6. The bumper of claim 1, wherein each of the transitions is continued by an intermediate section in the direction of the ends.

7. The bumper of claim 6, wherein the intermediate sections are continued by end sections.

8. The bumper of claim 1, wherein the center section of the crossbeam has in X-direction of the motor vehicle a substantially constant first width between the face plate and the bottom wall.

9. The bumper of claim 1, wherein the first width is ⅔ the second width.

10. The bumper of claim 6, wherein the intermediate section has in X-direction of the motor vehicle a substantially constant third width between the face plate and the bottom wall.

11. The bumper of claim 10, wherein the center section of the crossbeam has in X-direction of the motor vehicle a substantially constant first width between the face plate and the bottom wall, said third width being sized 0.9 to 1.1 times the first width.

12. The bumper of claim 11, wherein the first and third widths are identical.

13. The bumper of claim 1, wherein the crossbeam has a total length, said center section of the crossbeam having in longitudinal direction of the crossbeam a length which is sized 0.05 to 0.15 times the total length of the crossbeam.

14. The bumper of claim 13, wherein the length of the center section is 0.1 times the total length.

15. The bumper of claim 1, wherein the crossbeam has a total length, each said transition having in longitudinal direction of the crossbeam a length which is 0.1 to 0.2 times the total length of the crossbeam.

* * * * *